UNITED STATES PATENT OFFICE.

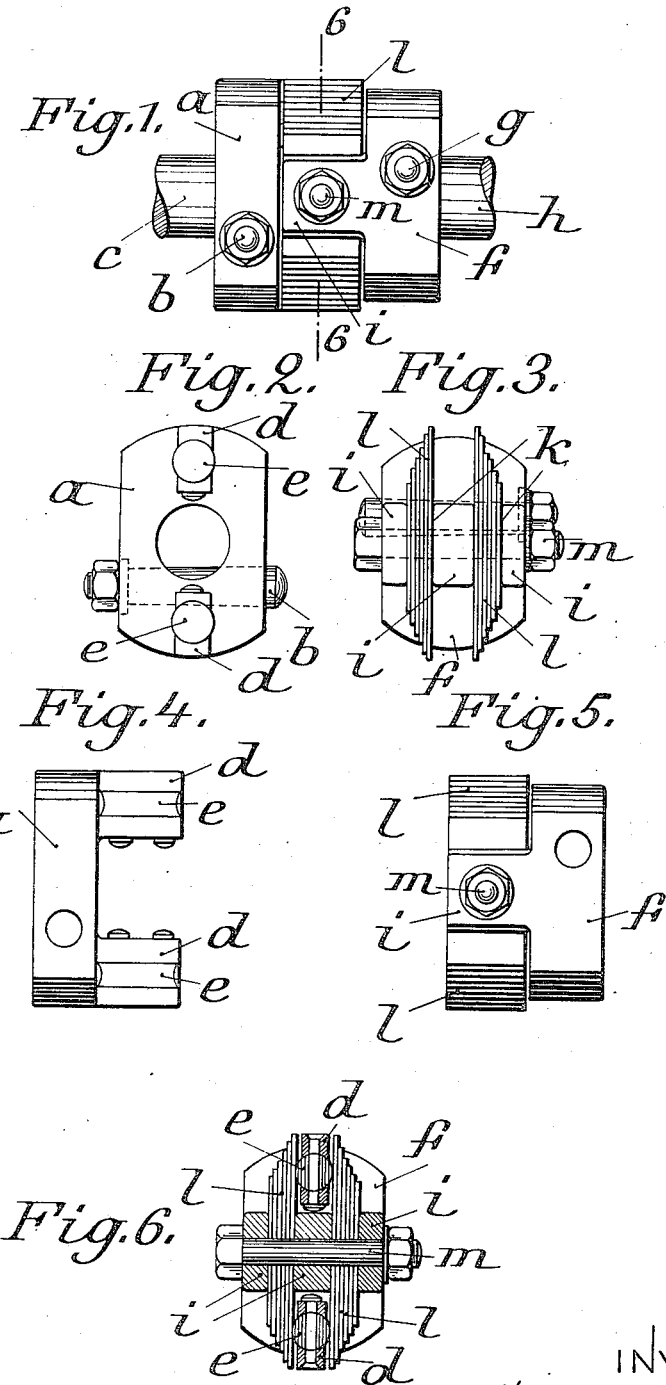

HERMANN STEINHART, OF STUTTGART, GERMANY, ASSIGNOR TO THE FIRM OF ROBERT BOSCH, OF STUTTGART, GERMANY.

SHAFT-COUPLING.

1,140,628.    Specification of Letters Patent.    Patented May 25, 1915.

Application filed January 31, 1912. Serial No. 674,548.

*To all whom it may concern:*

Be it known that I, HERMANN STEINHART, a subject of the Emperor of Germany, residing at Johannesstrasse 56, Stuttgart, Germany, have invented certain new and useful Improvements in Shaft-Couplings; and I do hereby declare the following to be a full, clear, and exact description of the invention, such as will enable others skilled in the art to which it appertains to make and use the same.

The present invention relates to shaft couplings, and more particularly to a spring coupling well adapted for axially abutting shafts for driving an electric ignition machine from the internal combustion engine associated with it.

In driving electric ignition machines of ordinary construction, the driving force fluctuates greatly as the rotating pole pieces sweep by the stationary magnets. In fact, the fluctuation is of such magnitude that the coupling parts reverse their driving and driven functions several times in each rotation, the normally driving part actually being driven by the normally driven part during some parts of each cycle.

In order to partially equalize the fluctuating character of the driving force, and for other well known reasons, a spring coupling has heretofore been interposed between the driving and driven shafts, but so far as I am aware the coupling has been constructed in such manner that the springs employed were flexed first in one direction and then in the other direction as a result of this reversal of driving and driven function of the parts. In consequence of continued repetition of this action, the spring element of such a coupling became brittle and unserviceable in practice after a comparatively short period of operation.

The present invention is directed to a construction avoiding the rapid destruction of the springs due to this cause. It accomplishes that purpose by employing in the coupling a spring structure, preferably two magazines of leaf springs, adapted to engage coöperative abutments in such manner that parts of the springs are flexed in one direction only, whether the driving and driven functions of the parts are reversed or not and whether the direction of rotation of the engine is reversed or not. In this way, one part of the springs of a magazine is flexed when the coupling parts become angularly displaced in one direction, while the other part of the springs is flexed when the coupling members become angularly displaced in the reverse direction, as a result of which no part of any spring is ever flexed in both directions.

In the accompanying drawings, illustrating the preferred embodiment of my invention, Figure 1 is a side elevation of the complete coupling; Fig. 2 is an end elevation of one of the coupling parts; Fig. 3 is an end elevation of the other coupling part; Fig. 4 is a side elevation of the coupling part of Fig. 2; Fig. 5 is a side elevation of the coupling part of Fig. 3; and Fig. 6 is a section on line 6—6 of Fig. 1.

The coupling part shown in Figs. 2 and 4 consists of a disk or plate $a$, which is rigidly fastened by the wedge bolt $b$ upon the end of the shaft $c$. The disk $a$ carries two diametrically disposed projections $d$, $d$, carrying the blocks $e$ of fiber or hard wood.

The coupling part shown in Figs. 3 and 5 consists of a disk or plate $f$ fastened in a like manner by a wedge bolt $g$ to the end of the shaft $h$, which, in ordinary applications, axially abuts the shaft $c$. The disk $f$ carries a diametrically disposed cross-piece $i$ in which two slots $k$, $k$ are made so as to form axially extending projections. Within the slots $k$, two magazines of flat metal springs $l$ are fastened intermediate of their ends, by means of the bolt $m$, and these springs may be said to be diametrically deposed.

When the two coupling parts are fixed in place, the ends of the spring magazines embrace the blocks $e$ on the other coupling part, the sides of the blocks forming coöperative abutments for the springs. By this arrangement, the two coupling parts may have their driving and driven functions reversed, or the direction of rotation of the engine may be reversed, without altering the direction of flexure of any given part of any of the springs. Upon angular displacement of the coupling parts in one direction, the coöperative blocks $e$ flex opposite ends of the two magazines in one direction, while the other ends of those springs are not flexed at all. However, when the angular displacement of the coupling parts is reversed, the other opposite ends of the spring magazines are flexed, while those ends which were flexed before are now not flexed at all. It will be obvious, therefore, that no part of any spring is ever flexed in both directions, inasmuch as certain parts of the springs resist angular displacement of the coupling parts in one direction, while other parts of the springs resist angular displacement of the coupling parts in the other direction.

There is no abutment or similar device which resists the movement of either of the spring magazines in the direction of displacement of the coupling parts, and therefore it may be said that the springs $l$ are free to flex in the direction of the displacement.

Having thus described my invention, what I claim is:

1. A flexible coupling for abutting shafts comprising a coupling part fastened to each shaft, a diametrically-disposed flat spring of metal fastened intermediate of its ends to one coupling part, and coöperative engaging means lying entirely on the same side of the spring and on opposite sides of the axis of rotation so as to have driving engagement with a single end of the spring at a time, the driving engagement occurring at one end of the spring upon angular displacement of the coupling parts in one direction and occurring at the other end of the spring upon angular displacement of the coupling parts in the other direction, and the spring being free to flex in the direction of the displacement of the coupling parts; substantially as described.

2. A flexible coupling for abutting shafts comprising a coupling part fastened to each shaft, two diametrically-disposed springs of metal fastened to one coupling part, and a rigid abutment on the other coupling part extending in an axial direction between the ends of the two springs so as to have driving engagement with a single one of the springs at a time, the driving engagement occurring at one spring during angular displacement of the coupling parts in one direction and occurring at the other spring during angular displacement of the coupling parts in the other direction, and the springs being free to flex in the direction of the displacement of the coupling parts; substantially as described.

3. A flexible coupling for abutting shafts comprising a coupling part fastened to each shaft, two diametrically-disposed flat springs of metal fastened intermediate of their ends to one coupling part, and coöperative abutments of rigid material on the other coupling part having driving engagement with one end of each spring upon angular displacement of the coupling parts in one direction and with the other end of each spring upon angular displacement of the coupling parts in the reverse direction so as to avoid reverse flexure in both ends of the springs upon reversal of the driving and driven functions of the coupling parts, the arrangement being such that the ends of the springs are free to flex in the direction of the displacement of the coupling parts; substantially as described.

4. A flexible coupling for abutting shafts comprising a coupling part fastened to each shaft, axially extending projections on one of the coupling parts, two diametrically disposed magazines of flat metal springs fastened intermediate of their ends to said projections, and diametrically disposed abutments of rigid material on the other coupling part arranged to project between said magazines to effect driving engagement with one end of each magazine upon angular displacement of the coupling parts in one direction and with the other end of each magazine upon angular displacement of the coupling parts in the reverse direction so as to avoid reverse flexure in both ends of the magazines upon reversal of the driving and driven functions of the coupling parts, the arrangement being such that the ends of the magazines are free to flex in the direction of the displacement of the coupling parts; substantially as described.

In testimony whereof I affix my signature, in presence of two witnesses.

HERMANN STEINHART.

Witnesses:
MAX ANSCHÜTZ,
PAUL WOLFART.